US006363761B1

(12) United States Patent
Sauerland

(10) Patent No.: US 6,363,761 B1
(45) Date of Patent: Apr. 2, 2002

(54) MODULAR ROD LOCKING SYSTEM

(75) Inventor: Manfred Sauerland, Essen (DE)

(73) Assignee: EMKA Beschlagteile GmbH & Co. KG (DE)

(*) Notice: Subject to any disclaimer, the term of this patent is extended or adjusted under 35 U.S.C. 154(b) by 0 days.

(21) Appl. No.: 09/410,650

(22) Filed: Sep. 30, 1999

Related U.S. Application Data

(63) Continuation-in-part of application No. PCT/DE98/00955, filed on Apr. 2, 1998.

(30) Foreign Application Priority Data

Apr. 2, 1997 (DE) ........................................ 197 13 518

(51) Int. Cl.[7] .............................................. B60R 25/02
(52) U.S. Cl. ........................ 70/208; 70/462; 292/336.3; 292/347
(58) Field of Search ........................ 70/208, 78, 81–84, 70/448–451, 461, 462, 466; 292/336.3, 32–40, DIG. 30, DIG. 31, DIG. 53, 347, 348

(56) References Cited

U.S. PATENT DOCUMENTS

| | | | | | |
|---|---|---|---|---|---|
| 4,754,624 | A | * | 7/1988 | Fleming et al. | 70/462 X |
| 5,092,144 | A | * | 3/1992 | Fleming et al. | 70/462 X |
| 5,685,181 | A | * | 11/1997 | Ramsauer | 70/208 |
| 5,722,269 | A | * | 3/1998 | Simon et al. | 70/208 |
| 5,862,690 | A | * | 1/1999 | Jancsek | 70/208 X |
| 5,873,274 | A | * | 2/1999 | Sauerland | 70/208 |
| 5,893,282 | A | * | 4/1999 | Runge et al. | 70/208 |
| 5,970,757 | A | * | 10/1999 | Ramsauer | 70/208 |
| 6,039,363 | A | * | 3/2000 | Sugimura et al. | 70/208 X |
| 6,053,018 | A | * | 4/2000 | Ramsauer | 70/208 |
| 6,138,484 | A | * | 10/2000 | Sauerland | 70/208 X |
| 6,174,007 | B1 | * | 1/2001 | Schlack et al. | 70/208 X |
| 6,182,483 | B1 | * | 2/2001 | Von Kathen et al. | 70/208 |

FOREIGN PATENT DOCUMENTS

| | | | |
|---|---|---|---|
| EP | 261267 | * | 9/1986 |
| FR | 2582711 | * | 12/1986 |

* cited by examiner

*Primary Examiner*—Suzanne Dino Barrett
(74) *Attorney, Agent, or Firm*—R.W. Becker & Associates; R. W. Becker

(57) ABSTRACT

A locking system for control-cabinet doors has a base member detachably mounted to an outer or inner side of a control-cabinet door. A pinion is mounted in the base member. First locking rods are mounted in the base member and are drivingly connected to the pinion. The first locking rods each have a projection extending away from the base member and engaging at least one second locking rod mounted on the inner side of the control-cabinet door to be longitudinally moveable for latching and unlatching the control-cabinet door. A detachable exterior cover is attached to the base member and covers the base member completely. The exterior cover has a first opening and an actuator is inserted through the first opening into the base member for rotating the pinion and moving the first locking rods.

5 Claims, 3 Drawing Sheets

MODULAR ROD LOCKING SYSTEM

This application is a continuation-in-part application of International Application PCT/DE98/00955 filed Apr. 2, 1998.

BACKGROUND OF THE INVENTION

The present invention relates to a locking system for doors of thin-walled control-cabinets with a base member to be fastened to the door blade wherein the base member has supported therein a pinion as well as short locking rods driven by the pinion and guided in the base member. The short locking rods have a respective projection projecting away from the base member for engaging at least one locking rod mounted at the inner side of the door blade and moveable in the longitudinal direction. An exterior cover covering the base member is mounted to the exterior side of the door blade and fastened to the base member. The pinion acts as a locking rod drive and is rotated by an actuator that is received in the exterior cover.

An individual locking system with the aforementioned features is disclosed in French Patent Document FR 2 582 711. The known locking system is designed exclusively for actuation of a pinion by a turn knob. The pinion is mounted within a base member attached to the exterior side of the door blade. An exterior cover can be placed onto the base member and can be connected to the base member.

An individual rod locking system of the aforementioned kind is also described in European Patent Document EP 0 261 267. The known rod locking system is comprised of a member positioned on the exterior side of the door blade and embodied similar to a lock cover or embodied as a depression for receiving a pivot lever in a flush arrangement. The member penetrates the door blade at least via one correlated cutout. At the inner side of the door blade a lock box with a pinion arranged therein is provided for driving at least one locking rod. The lock box is connected to a projection of the member which penetrates the door blade. The attachment and the lock box are thus together attached to the door blade. When the locking system is embodied as a pivot lever locking system, the member mounted on the exterior side of the door blade penetrates the door blade with a second projection. This second projection is adapted to receive a locking device for the pivot lever when folded into the depression of the attachment.

The prior art as represented by the aforementioned Patent Documents FR 2 582 711 and EP 0261 267 have the disadvantage that the different actuating and mounting systems of the two essentially known locking systems are not exchangeable. While the use of a turn knob as disclosed in FR 2 582 711 allows direct access onto the pinion mounted within the base member, the transmission of the rotational movement of the pivot lever in the known rod locking system of EP 0 261 267 requires the arrangement of a separate lock box.

It is therefore an object of the present invention to provide a locking system with the aforementioned features in which exchange of the different actuators is possible without changing the basic design of the locking system.

SUMMARY OF THE INVENTION

According to the present invention it is suggested that the base member is plate-shaped and designed for receiving different types of actuators such as grips, socket keys, or pivot levers. It can be directly attached to the exterior side or the inner side of the door blade. The exterior cover of the locking system is embodied as a lock cover plate with an opening for insertion of the actuator for actuating the pinion supported in the base member. The actuator can be embodied as a grip or socket key or, in the alternative, as a pivot lever which can be placed into a depression at the exterior cover, wherein the exterior cover has an opening aligned with the lock receiving chamber of the plate-shaped base member. The exterior cover is exchangeably mounted on the base member.

According to the present invention, the plate-shaped base member is of identical design for all different embodiments of the invention and requires no adaptation to the desired actuation principle, while it is flexible with regard to its attachment, i.e., it can be mounted to the exterior side or the inner side of the door blade. The embodiment of the locking system with adaptation of the respective exterior cover to the respectively desired actuator provides in an advantageous manner a free design choice of the exterior cover, especially with respect to the embodiment of the lock cover plate as well as with respect to the embodiment of a depression for a folding pivot lever. When the exterior cover is designed for receiving a grip or socket key as an actuator, the exterior cover, embodied as a lock cover plate and provided with an opening allowing access to the pinion mounted within the plate-shaped base member, covers the receiving chamber for insertion of a lock provided within the plate-shaped base member because such a lock embodiment is not necessary for a grip or socket key-type actuation. In an advantageous manner, the base member can be of unchanged design with respect to all its functional parts and can simply be redesigned such that a flat lock cover plate is provided. When the exterior cover has a depression for receiving a foldable pivot lever, the design is based on the already known concept that the lock for locking the pivot lever in the folded position is stationary within the depression. In this design the exterior cover is provided with an opening that is aligned with the receiving chamber of the plate-shaped base member that receives the lock.

For an exterior cover which is provided with a depression for the pivot lever, the opening which is aligned with the receiving chamber for the lock, is provided with a moveably guided cover. This cover can be embodied as a roll cover that is slidable within the exterior cover and is matched to the contour of the exterior cover.

In order to allow for multiple mounting variations of the plate-shaped base member, it is suggested that the base member is provided with a plurality of fastening throughbores at the contact locations at the door blade. This allows to arrange the plated-shaped base member in a position that corresponds to the cutout of the door blade, respectively, allows attachment thereof at the door blade with respect to preventing vandalism.

According to one embodiment of the invention, one of the short locking rods guided in the plate-shaped base member is provided with a bent or angled portion such that the projections of both short locking rods are aligned with one another. This has the advantage that, when mounting the locking system to the exterior side of the door blade, only one continuous slot must be arranged in the door blade so that the aligned projections of the rod locking system can be used in connection with very narrow spaces with already aligned locking rods.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 3.

Figure 1:
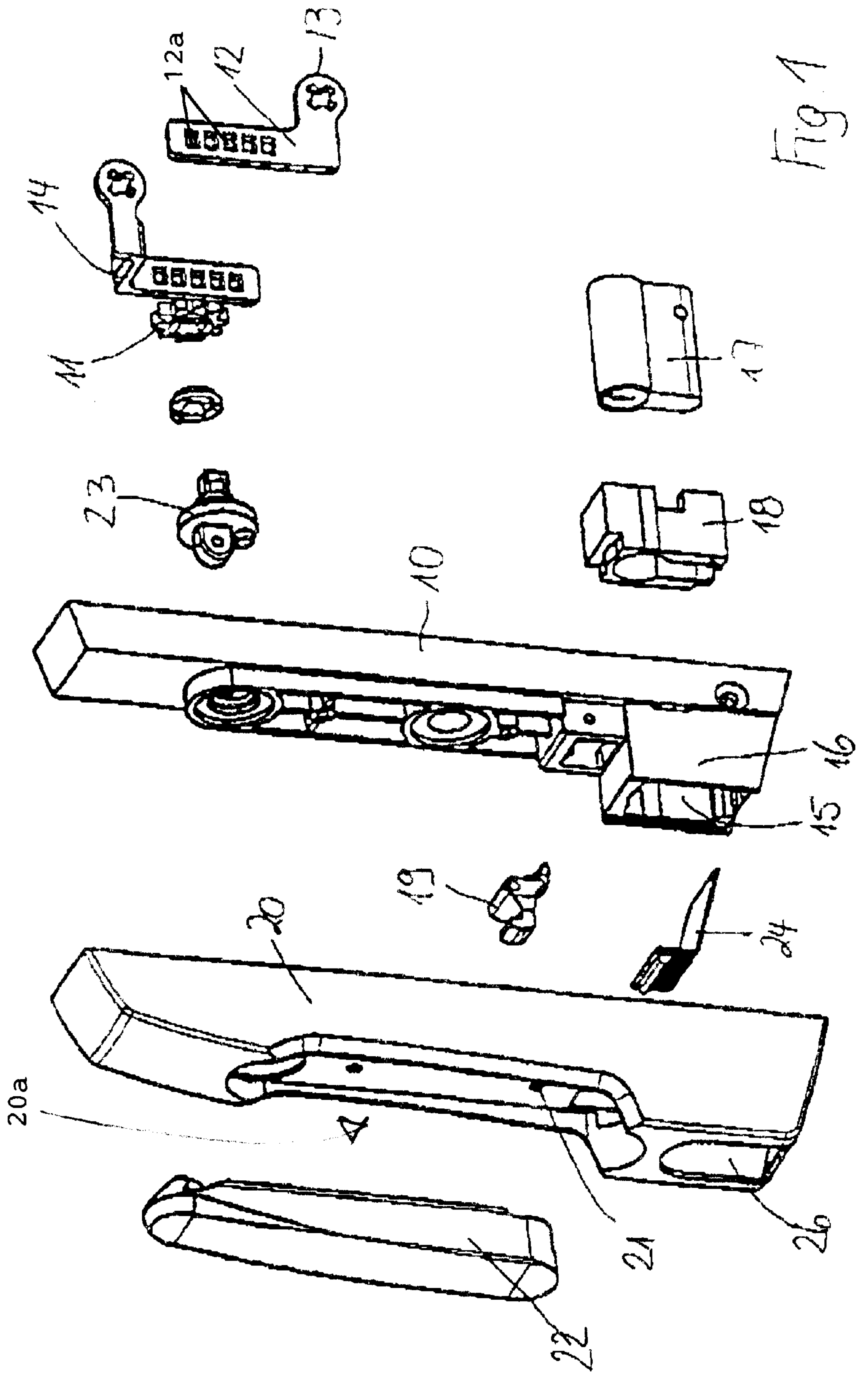
FIG. 1 shows a rod locking system of the invention in an exploded perspective view.
Figure 2:
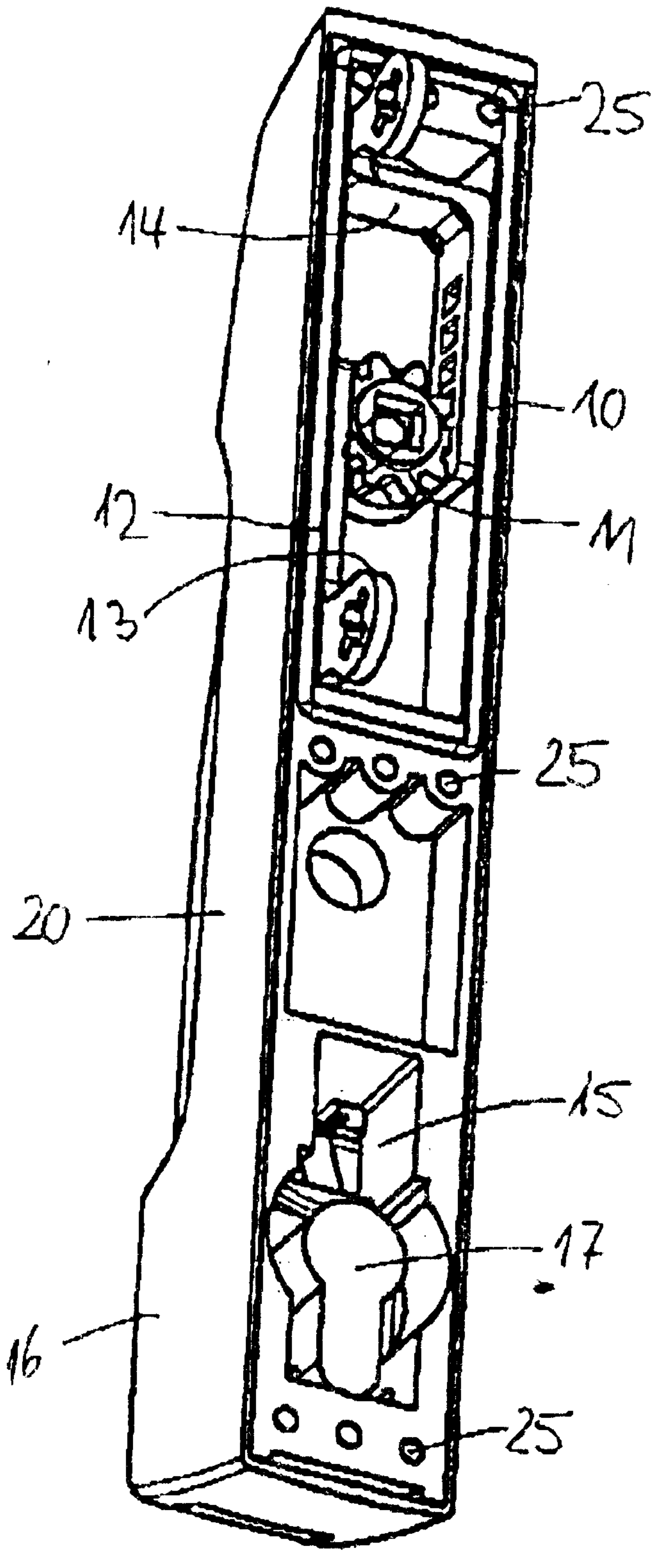
FIG. 2 shows a back view of the inventive rod locking system assembled from the individual parts shown in FIG. 1.

The embodiment represented in FIGS. 1 and 2 is a rod locking system having a pivot lever as an actuator. The rod locking system is comprised of a plate-shaped base member 10, in which a pinion 11 with outer toothings as well as short locking rods 12 engaging the pinion 11 are mounted. The two short locking rods 12 are positioned on opposite longitudinal sides of the base member 10 and engage with respective cutouts 12*a* the pinion 11. The short locking rods 12 are provided with projections 13 projecting away from the plane of the plate-shaped base member 10. When mounting the locking system at the door blade, a respective locking rod for latching and unlatching the door blade is connected to these projections 13. In order to provide a common movement plane for the locking rods, one of the two short locking rods 12 has an angled portion 14 so that the projections 13 of the two short locking rods 12 are aligned relative to one another with respect to their movement direction.

At the lower area the plate-shaped base member 10 has a receiving chamber 15 for receiving a lock for the pivot lever 22. The lock is comprised of a modular insert 18 with a cylinder lock 17 inserted as shown in the receiving chamber 15. When employing a pivot lever locking system, a locking lever 19 is provided for locking the pivot lever. The locking lever 19 is actuated by the cylinder lock 17.

When employing a pivot lever locking system, the plate-shaped base member 10 is provided at its lower area with an auxiliary member 16 in which the lock (17, 18, 19) is positioned and guided. However, when using the turn knot) or grip or socket key as an actuator in connection with a lock cover this auxiliary member 16 is not needed.

The exterior cover 20 for covering the plate-shaped base member 10 can be connected to the base member 10 by fastening bores 21. In the shown embodiment the exterior cover 20 is embodied with a depression 20*a* for receiving the folded pivot lever 22. For connecting the pivot lever 22 to the pinion 11 in the plate-shaped base member 10, an actuator shaft 23 is provided which engages with its end the pinion 11. The other end of the actuator shaft 23 is provided with a connecting means for attaching the pivot lever 22. The exterior cover 20 is provided with an opening 26 in the area that covers the auxiliary member 16 of the plate-shaped base member 10. This opening 26 allows access to the cylinder lock 17 provided as a lock for the pivot lever 22. The opening 26 can be covered by a roll cover 24 such that the insertion opening of the cylinder lock 17 is covered when the roll cover 24 is closed.

For fastening the plate-shaped base member 10 to the door blade, numerous fastening bores 25 are distributed about the contact surfaces of the base member 10 resting at the door blade. All of them or only some of them can be used in any suitable combination for attaching the plate-shaped base member 10 to the door blade.

Figure 3:
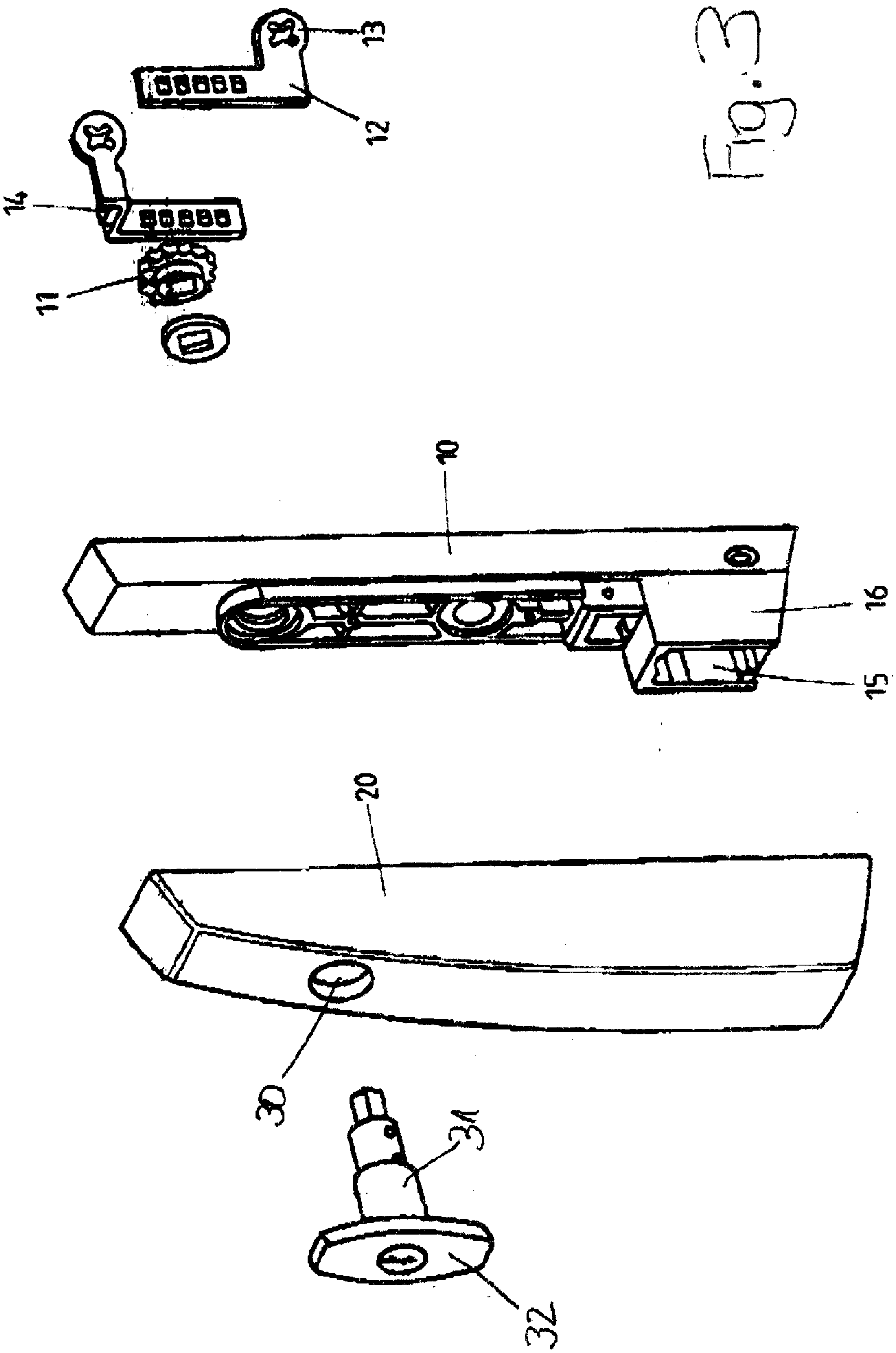
FIG. 3 shows the inventive rod locking system having an exterior cover embodied as a lock cover plate.

The embodiment represented in FIG. 3 shows the inventive rod locking system with an exterior cover 20 that is embodied as a lock cover plate. The exterior cover 20 has an opening 30 for inserting the actuation shaft 31 of a turn knob 32 as an actuator into the pinion 11. In this embodiment the cylinder lock 17 and the modular insert 18 are not needed. However, the structure of the base member 10 remains unchanged.

The specification incorporates by reference the disclosure of German priority document 197 13 518.8 of Apr. 2, 1997 and of international application PCT/DE98/00955 of Apr. 2, 1998.

The present invention is, of course, in no way restricted to the specific disclosure of the specification and drawings, but also encompasses any modifications within the scope of the appended claims.

What is claimed is:

1. A locking system for control-cabinet doors, said locking system comprising:

a plate-shaped base member (10) adapted to be selectively and directly attached to either an outer or inner side of a control-cabinet door;

a pinion (11) mounted in said base member (10);

first locking rods (12) mounted in said base member (10) and drivingly connected to said pinion (11);

said first locking rods (12) each having a projection (13) extending away from said base member (10) and engaging at least one second locking rod mounted on an inner side of the control-cabinet door to be longitudinally moveable for latching and unlatching the control-cabinet door;

an exchangeably mounted exterior cover (20) attached to said base member (10) and covering said base member (10) completely;

an actuator (22, 32) for rotating said pinion (11) and moving said first locking rods (12), wherein said actuator is a pivot lever (22) or a turn knob (32) having a shaft (31);

wherein when said actuator is a pivot lever (22), said exterior cover has a first opening and a depression (20*a*), said opening (26) in said cover aligned with a receiving chamber (15) in said base member for receiving a lock (17, 18) therethrough, and wherein said pivot lever is received in said depression (20*a*) when in an inactive position; and wherein when said actuator is a turn knob, said exterior cover is a lock cover plate having a second opening, said lock cover plate covering said receiving chamber (15) of said base member (10), and wherein said turn knob shaft (31) engages said pinion (11).

2. A locking system according to claim 1, wherein said first opening has a moveable cover (24) connected to said exterior cover (20).

3. A locking system according to claim 2, wherein said moveable cover (24) is a roll cover matching a contour of said exterior cover (20).

4. A locking system according to claim 1, wherein said base member (10) has a plurality of fastening bores (25) for attaching said base member (10) to the control-cabinet door.

5. A locking system according to claim 1, wherein one of said first locking rods (12) has a bent portion (14) such that said projections (13) of said locking rods (12) are aligned with one another.

* * * * *